UNITED STATES PATENT OFFICE.

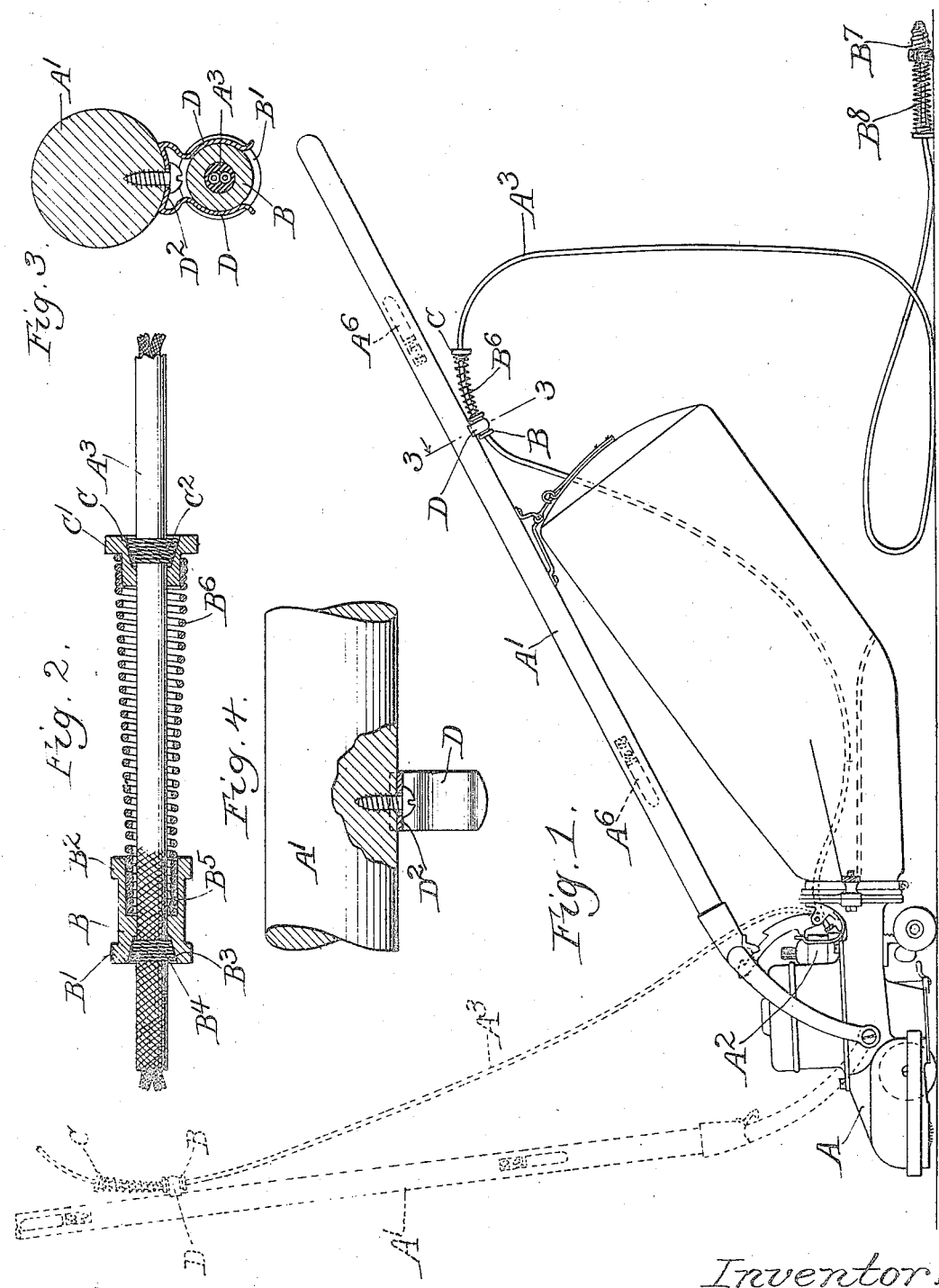

HOWARD EARL HOOVER, OF CHICAGO, ILLINOIS, ASSIGNOR TO THE HOOVER SUCTION SWEEPER COMPANY, OF NEW BERLIN, OHIO, A CORPORATION OF OHIO.

ELECTRIC-CORD ANCHORAGE.

1,402,860.  Specification of Letters Patent.  Patented Jan. 10, 1922.

Application filed May 1, 1918. Serial No. 231,945.

*To all whom it may concern:*

Be it known that I, HOWARD EARL HOOVER, a citizen of the United States, residing at Chicago, in the county of Cook and State of Illinois, have invented a certain new and useful Improvement in Electric-Cord Anchorage, of which the following is a specification.

My invention relates to improvements in electric cord anchorage for suction sweepers, though obviously the particular anchorage might be used in many other circumstances. The situation is that electric suction sweepers have to have an electric cord supplying the current to the motor. This cord leads from the wall plug to the apparatus and as the apparatus is moved, changes in tension on the cord occur. It has been customary in the past to surround the cord where it enters the switch housing with a coiled wire spring which while yielding and flexible makes it impossible to sharply and suddenly bend the cord and thus break the cord or the insulation. It has also been customary to wind the cord on clips on the cleaner when the apparatus is not in use, but since the cord does not fasten on to the cleaner at the same point as the handle, it frequently happens that the user will wind the cord on the clips when the handle is down in the working position and then try to lift the handle to the vertical or storage position which pulls the cord from the switch.

My invention provides means making sure that the cord will, when wound on the handle be always wound at the proper place so there will be sufficient free length to make it possible to tip the handle into the storage position and put the machine away. This might be done by anchoring the cord on the handle rigidly and permanently, but then it would be difficult to disassemble the machine for shipment or long storage or for repair. I provide a stop fixed on the cord but removable on the handle, so that there is always sufficient length of cord between the handle and the machine to permit of manipulation, but so the cord may be released from the handle without too great difficulty should occasion arise. In co-operation with this I provide means for protecting the cord against breaking.

My invention, therefore, relates to an anchorage for a cord for suction cleaners, but it might be for other electrical apparatus where electric cords are moved about.

My invention is illustrated more or less diagrammatically in the accompanying drawing, wherein—

Figure 1 is a side elevation of a suction sweeper showing the cord and associated parts in place;

Figure 2 is a section on an enlarged scale through the anchorage and cord spring with the cord in position;

Figure 3 is a section along the line 3—3 of Figure 1 on an enlarged scale;

Figure 4 is a section on an enlarged scale of the holding clip.

Like parts are indicated by like characters in all the figures.

A is a suction sweeper of the usual well-known type supplied with a handle $A^1$ and a control switch $A^2$. $A^3$ is a conductor terminating at one end in the switch and adapted at the other end to be connected to any suitable source of electrical power. It will be noted that the conductor comes directly out of the switch housing and that no special protecting means are needed at that point. $A^6$ are clips on the handle about which the cord is to be wound when the machine is not in use.

At a short distance from the switch end of the conductor is a spool or thimble B. This spool or thimble B is cylindrical in form with flanges $B^1$, $B^2$ at the ends. It is hollow so that it more or less snugly fits the cord. At one end it is provided with a tapered counterbore $B^3$. $B^4$ is a ring of suitable material surrounding and snugly engaging the electric conductor. This ring $B^4$ is so sized that it just fills the counterbore $B^3$ and is more or less compacted by being wedged therein owing to the shape of the counterbore. This thread cannot move along the cord without pulling it to pieces because it grips it tightly. I have shown wound thread wrapped around the conductor to position the parts therealong but obviously adhesive tape, friction tape, rubber gum or many other materials might be used it being sufficient only that whatever is used grip the cord $A^3$ firmly so as to make it impossible or substantially impossible to move it and its associated parts along the cable. The adhesion of this packing or other material to the cable should be sufficient so that the whole tool may be raised by holding on the cable itself and jerked up and down without slippage. This is not the kind of service which such tools and their associated parts ought to be submitted to but they are submitted to such service in practice and the assembly should be strong enough to stand it with impunity.

The other end of the spool is provided with a deep cylindrical counterbore $B^5$ of slightly larger diameter than the counterbore $B^3$. In this counterbore $B^5$ is inserted the end of the spiral spring coil $B^6$. The counterbore $B^5$ is smaller in diameter than the normal outside diameter of the spring coil so that when it is screwed down it stays there by the expansion of the spring. This spring extends quite a distance from the spool. $B^7$ is the ordinary plug adapted to screw into a wall socket. The conductor wire $A^3$, of course, is connected in the plug in the usual manner and a guard spring $B^8$ surrounds the conductor where it leaves the plug so as to protect it at that point against breaking and distortion in exactly the same way as the spring $B^6$ protects it adjacent the tool.

C is a flanged sleeve bored out to the diameter of the cord and counterbored as at $C^1$. $C^2$ is a similar coil of waxed thread or other material wound about the cord and wedged into the counterbore $C^1$. The sleeve is of larger diameter than the normal inside diameter of the spring coil and thus when the spring is expanded it contracts on the sleeve and is held in place. The flange on the sleeve makes it impossible for the coil to slip out beyond it.

It will be understood that the coil is under a slight compression owing to the fact that it is compressed before the second thread coil is wound about the conductor. Thus the compression of this coil spring tends to hold all parts snugly in position and to wedge the two thread coils into the two counterbores.

D is a spring clip rising from a base $D^2$ screw-threaded on the handle $A^1$. This spring is so arranged that the spool B may be sprung into position in it or withdrawn from it by the insertion of a sufficient force. Normally, however, the spool is held in position by the arms of the spring and the flanges on the spool. It will be understood that the right-hand end of the conductor leads to the wall plug or other suitable source of electrical power and the left-hand end of the conductor to the motor. The left-hand end, since no tension can come upon it, needs not to be protected. The right-hand, which leads to a long length of electric conducting cord and upon which tension may be inadvertently applied, is reenforced by the spring coil which as above suggested makes it impossible for the coil to be kinked and the insulation broken.

It will be evident that while I have shown in my drawings an operative device, still many changes might be made both in size, shape and arrangement of parts without departing materially from the spirit of my invention and I wish, therefore, that my drawings be regarded as in a sense diagrammatic.

The use and operation of my invention are as follows:—

In assembling the machine, the conductor cord is anchored in the switch in the usual manner preferably more or less permanently because it is not expected that there will be any disconnection at that point. The spool is then placed on the cord and moved down to substantially the proper position. It is followed by the coil spring and then by the sleeve, but they are not necessarily assembled together, though they might be assembled together before being threaded on the cord and put on as a unit, depending on the condition of manufacture. The thread will be wound about the electric cord at the spool end of the group at a sufficient distance from the switch until of substantially the proper size to fill the counterbore. The assembly will be moved until the thread is enclosed in the counterbore and the spring compressed to give room to wind a similar cord at the other end of the group assembly. The spring will be released and the second counterbore filled with the second coil thread, the spring having meanwhile expanded but not far enough to release the tension.

The cord is then provided with the usual wall plug and is shipped in that manner with such plug. When the machine is to be assembled at the point of use or delivery the handle, which is for shipping detached from the cleaner housing, will be put in place. The spool will be slipped into the clip on the handle and the cord then wound about the handling clips on the handle. From this time on the spool will never be detached from the handle unless it is desired to take the handle away or remove the cord and obviously since there is a greater length of cord between the spool and the switch than the distance between them at their furthest, the cord will never be broken between the switch and the handle and owing to the spring surrounding the cord at the other side, it will there be protected against undue distortion and breakage.

I claim:—

1. The combination of an electric tool with a handle, a conductor attached to the tool and an anchorage for supporting the conductor from the handle, comprising two detachably self engaging parts, one fixedly attached to the handle and the other fixedly attached to the conductor.

2. The combination of an electric tool with a handle, a conductor attached to the tool and an anchorage for supporting the conductor from the handle, comprising two detachably self engaging parts, one fixedly attached to the handle and the other fixedly attached to the conductor, and means for preventing relative movement while in engagement.

3. The combination of an electric tool with a handle, a conductor attached to the tool and an anchorage supporting the conductor from the handle, comprising a spring clip fixedly attached to the handle and a detachably engaging part fixedly attached to the conductor.

4. The combination of an electric tool with a handle, a conductor attached to the tool and an anchorage for supporting the conductor from the handle, comprising two detachably engaging parts, one fixedly attached to the handle and the other consisting of a spool like structure fixedly attached to the conductor.

5. The combination of an electric tool and a handle, a conductor attached to the tool and an anchorage for supporting the conductor from the handle, comprising two parts, one a spring clip attached to the handle and the other a spool like structure fixedly attached to the conductor and adapted to detachably engage the clip.

6. The combination of an electric tool with a handle, a conductor attached to the tool and an anchorage for supporting the conductor from the handle, comprising two detachably engaging parts, one fixedly attached to the handle and the other fixedly attached to the conductor, and means associated with the anchorage part on the conductor extending outwardly along the conductor for preventing kinking thereof.

7. The combination of an electric tool with a handle, a conductor attached to the tool and an anchorage for supporting the conductor from the handle, comprising two detachably engaging parts, one fixedly attached to the handle and the other fixedly attached to the conductor, and a spiral spring wound about the conductor and attached at one end on the anchorage part which is attached to the conductor to prevent the conductor from kinking.

8. An anchorage for electric conductors comprising a stop through which the conductor passes, a spiral spring having one end embedded within the stop, a flanged sleeve located within the other end of the spring, the sleeve and the stop being counter sunk on the sides removed from the spring, and holding means interposed between the conductor and the counter sunk portion of the sleeve and stop.

9. An anchorage for electric conductors comprising a stop through which the conductor passes, a spiral spring having one end embedded within the stop, a flanged sleeve located within the other end of the spring, the sleeve and the stop being counter sunk on the sides removed from the spring and holding means interposed between the conductor and the counter sunk portion of the sleeve and stop, said means comprising coils of thread wound snugly about the conductor.

10. An anchorage for electric conductors comprising a stop through which the conductor passes, a spiral spring having one end embedded within the stop, a flanged sleeve located within the other end of the spring, the sleeve and the stop being counter sunk on the sides removed from the spring and holding means interposed between the conductor and the counter sunk portion of the sleeve and stop, said means comprising coils of thread wound snugly about the conductor, the counter sunk portion of the sleeve and stop being tapered to compress the coils on the conductor.

11. The combination with an electric tool having a handle of a power conductor associated therewith a stop mounted on the conductor, a spring coil projecting from the stop and surrounding the conductor and extending therealong a short distance, means for permanently holding the stop and spring coil against movement along the conductor.

12. The combination with an electric tool having a handle of a power conductor associated therewith a stop mounted on the conductor, a spring coil projecting from the stop and surrounding the conductor and extending therealong a short distance, means for permanently holding the stop and spring coil against movement along the conductor said means interposed between the stop and coil and the conductor.

13. The combination with an electric tool having a handle of a power conductor associated therewith a stop mounted on the conductor, a spring coil projecting from the stop and surrounding the conductor and extending therealong a short distance, means for permanently holding the stop and spring coil against movement along the conductor, means on the handle for detachably holding the stop in position thereon.

14. The combination with an electric tool having a handle of a power conductor associated therewith a stop mounted on the conductor, a spring coil projecting from the stop and surrounding the conductor and extending therealong a short distance, means for permanently holding the stop and spring coil against movement along the conductor said means interposed between the stop and coil and the conductor, means on the handle for detachably holding the stop in position thereon.

15. The combination with an electric tool of a handle therefor of an electric conductor terminating at one end of the tool and an anchorage on the handle comprising a spring clip and stop adapted to engage it on the conductor, means for holding the stop against movement along the conductor, the length of the conductor between the stop and the tool being greater than the maximum distance between the anchorage on the handle at the point where the conductor is attached to the tool.

16. The combination with an electric tool of a handle therefor of an electric conductor terminating at one end of the tool and an anchorage on the handle comprising a spring clip and stop adapted to engage it on the conductor, means for holding the stop against movement along the conductor, the length of the conductor between the stop and the tool being greater than the maximum distance between the anchorage on the handle at the point where the conductor is attached to the tool, means projecting outwardly from the tool for preventing kinking of the conductor.

In testimony whereof, I affix my signature in the presence of two witnesses this 22nd day of April, 1918.

HOWARD EARL HOOVER.

Witnesses:
MARION INGRAHAM,
MINNIE M. LINDENAN.